US006754320B2

(12) United States Patent
Daase et al.

(10) Patent No.: US 6,754,320 B2
(45) Date of Patent: Jun. 22, 2004

(54) PROCESS, EXCHANGE, CHARGE COMPUTER, CHARGE BILLING COMPUTER AND PROGRAM MODULES FOR THE PROCESSING OF CHARGE DATA FOR TELECOMMUNICATIONS SERVICES

(75) Inventors: Detlef Daase, Berlin (DE); Irina Müller, Berlin (DE); Ferdinand Geisbüsch, Asperg (DE); Bettina Althainz, Berlin (DE)

(73) Assignee: Alcatel, Paris (FR)

( * ) Notice: Subject to any disclaimer, the term of this patent is extended or adjusted under 35 U.S.C. 154(b) by 16 days.

(21) Appl. No.: 09/757,576

(22) Filed: Jan. 11, 2001

(65) Prior Publication Data

US 2001/0040947 A1 Nov. 15, 2001

(30) Foreign Application Priority Data

Jan. 12, 2000 (DE) ......................................... 100 00 825

(51) Int. Cl.[7] .......................... H04M 15/00; H04M 1/24
(52) U.S. Cl. ........................... 379/121.01; 379/121.05; 379/126; 379/115.01; 379/9.03; 379/13; 379/9.05; 379/221.04; 379/114.03
(58) Field of Search ........................... 379/126, 127.01, 379/120, 121, 119, 13, 114.03, 121.01, 121.04, 121.05, 121.06, 115.01, 115.02, 115.03, 124, 133, 134, 114.28, 114.29, 220.01, 221.01, 221.02, 221.06, 221.03, 221.04; 455/405, 406

(56) References Cited

U.S. PATENT DOCUMENTS

| 5,333,184 | A | * | 7/1994 | Doherty et al. | 379/115 |
|---|---|---|---|---|---|
| 5,506,893 | A | * | 4/1996 | Buscher et al. | 379/114 |
| 5,784,443 | A | * | 7/1998 | Chapman et al. | 379/119 |
| 5,802,142 | A | * | 9/1998 | Browne | 379/28 |
| 5,852,659 | A | * | 12/1998 | Welter, Jr. | 379/116 |
| 5,875,238 | A | * | 2/1999 | Glitho et al. | 379/112 |
| 5,896,440 | A | * | 4/1999 | Reed et al. | 379/1 |
| 5,907,603 | A | * | 5/1999 | Gallagher et al. | 379/133 |
| 6,002,754 | A | | 12/1999 | Jaiswal et al. | |
| 6,005,920 | A | * | 12/1999 | Fuller et al. | 379/1 |
| 6,018,576 | A | * | 1/2000 | Croslin | 379/221 |
| 6,038,439 | A | * | 3/2000 | Rune | 379/114 |
| 6,098,076 | A | * | 8/2000 | Rekieta et al. | 379/9 |
| 6,137,862 | A | * | 10/2000 | Atkinson et al. | 379/34 |
| 6,298,125 | B1 | * | 10/2001 | Goldberg et al. | 379/114 |
| 6,327,345 | B1 | * | 12/2001 | Jordan | 379/379 |
| 6,356,628 | B1 | * | 3/2002 | Burke et al. | 379/112.06 |
| 6,400,813 | B1 | * | 6/2002 | Birnhak | 379/133 |

FOREIGN PATENT DOCUMENTS

GB          0957 644 A1  * 11/1999
WO          WO 97/26739     7/1997

* cited by examiner

Primary Examiner—Rexford Barnie
(74) Attorney, Agent, or Firm—Sughrue Mion, PLLC

(57) ABSTRACT

The present invention relates to a process, an exchange (SW1), a charge computer (BS1), a charge billing computer (BC) and a program module in each case for an exchange (SW1), for a charge computer (BS1) and for a charge billing computer (BC) for the processing of charge data.

A first exchange (SW1) sends first charge source data for telecommunications services to a charge computer (BS1) which converts the first charge source data into first charge billing data detectable by a charge billing computer (BC). The charge computer (BS1) sends the first charge billing data to the charge billing computer (BC). For this purpose it is proposed that at least one second exchange (SW2) sends second charge source data for telecommunications services to the charge computer (BS1), that the charge computer (BS1) converts the second charge source data into second charge billing data detectable by the charge billing computer (BC) and that the charge computer (BS1) sends the second charge billing data to the charge billing computer (BC).

4 Claims, 1 Drawing Sheet

PROCESS, EXCHANGE, CHARGE COMPUTER, CHARGE BILLING COMPUTER AND PROGRAM MODULES FOR THE PROCESSING OF CHARGE DATA FOR TELECOMMUNICATIONS SERVICES

BACKGROUND OF THE INVENTION

The present invention relates to a process for processing charge data for telecommunications services, an exchange, a charge computer, a charge billing computer, a program module for an exchange, a program module for a charge computer and a charge billing computer, all for implementing this process.

In the known processes for the charge billing of telecommunications services, exchanges of a telecommunications network send a charge billing computer charge messages for telecommunications services which have in each case been used by users of the telecommunications network served by the exchanges. This is also often referred to as billing centre (BC) or customer care and billing centre (CCBC). Charge messages for call connections are also referred to in particular as call tickets. The exchanges send the charge messages in a format and structure adapted to the relevant charge billing computer to be used. For this purpose the exchanges must be adapted in a complex manner to the relevant charge billing computer to be used and require suitable interface modules.

In a first solution to this problem, an exchange is in each case preceded by a charge computer which converts the charge source data from a format customarily used in the exchange into charge billing data represented in a format intelligible to the charge billing computer. Additionally, some data are also eliminated from the charge source data by the charge computer, thereby minimising the load on the transmission path to the charge billing computer and on the charge billing computer itself. Such a charge computer is for example a server connected via a LAN (Local Area Network) to the exchange. To increase the fail-safety, the server is expediently a double computer unit with which one sub-computer can in each case assume the functions of the other sub-computer. Despite the expediency and proven practical success of such a charge computer, the required double computer unit is so cost-intensive that smaller exchanges cannot be equipped with a separate charge computer of this kind but must themselves generate and transmit charge messages for the charge billing computer in the complex manner described in the introduction.

SUMMARY OF INVENTION

Therefore the object of the invention is to provide cost-efficient and effective processing for charge data for exchanges.

This object is achieved by a process, an exchange, a charge computer, a charge billing computer, a program module for an exchange, a program module for a charge computer and a program module for a charge billing computer, all as described more fully below. Combinations of the solutions referred to in the claims and the description are readily possible.

The invention is based on the principle that a charge computer, by which charge source data are converted into charge billing data processible by a charge billing computer and optionally buffered, is assigned not only one exchange but also at least one second exchange. The charge computer processes charge source data received from the relevant exchanges and converts these so that they can be interpreted as charge billing data by a downstream charge billing computer. By inserting identifier fields or by using dedicated connection paths, the charge computer ensures that the charge billing computer can assign to the relevant exchanges the charge billing data which have been received from the charge computer but which emanate from different exchanges. The complex processing of the charge source data is thus displaced from the relevant exchanges to a charge computer, it being possible to use the charge computer for a plurality of exchanges and thus to achieve an optimal cost-benefit ratio. The exchanges, which are substantially designed to establish connections under real-time conditions, are relieved of the processing of the charge source data which, with the exception of the so-called hot billing process, need not take place under time-critical conditions, and can be produced in a correspondingly cost-efficient manner. Adaptation to new requirements on the part of the charge billing computer is also more easily possible as not every exchange, but only the charge computer serving the exchanges, need be adapted to the charge billing computer.

The charge computer can expediently consist of a substantially fail-safe double computer unit.

In an advantageous further development of the invention, at least one of the exchanges assigned to a charge computer checks whether the charge computer is available. If this is not the case, the exchange then sends an alarm message for example to a network control centre which controls and monitors the exchange. Even if the charge computer has to send a fault message or information message, advantageously it sends such a message to one or more of the exchanges which it is assigned, which then inform(s) the network control centre. The charge computer thus does not essentially require its own interface for a network control centre and, from the standpoint of the network control centre, an exchange and the charge computer assigned thereto form a common network node to be integrally controlled and monitored.

To increase the fail-safety, in a further advantageous variant of the invention, an exchange is assigned not only one charge computer but also at least one second charge computer or further charge computers. If the first charge computer is overloaded or fails, the exchange can then send its charge source data to the second charge computer.

A further increase in the fail-safety is achieved in that an exchange and the charge computer assigned thereto can communicate with one another via alternative communications paths. In the event of the failure of one communications path, the relevant other communications path can then be used. This variant of the invention is particularly fail-safe if different physical paths or even different telecommunications networks are used for the communications paths.

In a preferred variant of the invention, an exchange and the charge computer assigned thereto communicate via a connection on which it is possible to use an internet protocol, as cheaply obtainable components can be used for this purpose, in particular for the charge computer, and an internet protocol is flexibly adaptable for the telegram interface between charge computer and exchange.

BRIEF DESCRIPTION OF THE DRAWINGS

In the following the invention and the advantages thereof will be described in the form of an exemplary embodiment making reference to the drawing wherein.

DETAILED DESCRIPTION OF THE INVENTION

Figure 1:
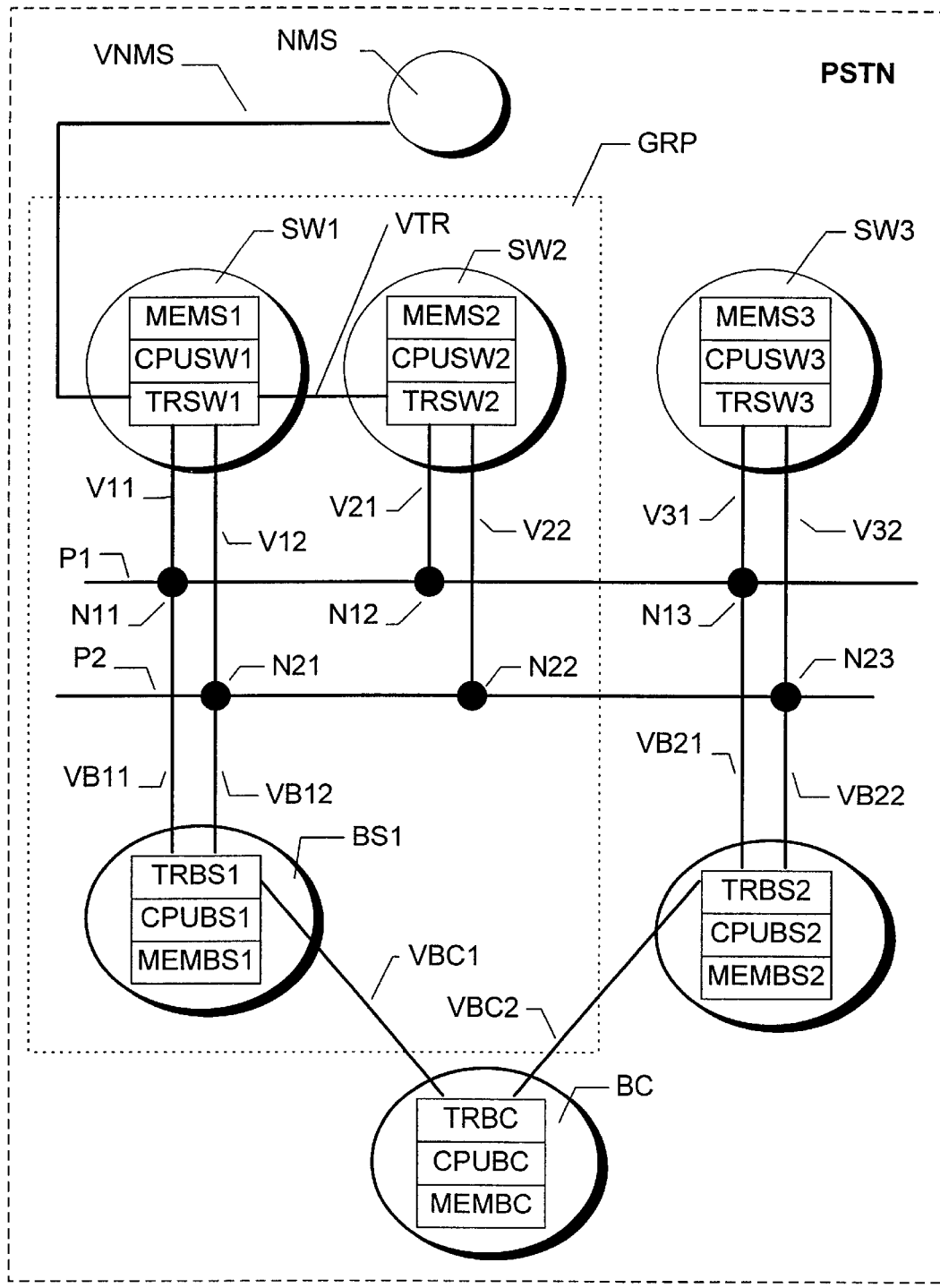
FIG. 1 illustrates an arrangement for the implementation of the process according to the invention, exemplary embodiments of exchanges SW1, SW2 and SW3 according to the invention, and charge computers BS1 and BS2 according to the invention which are connected to a charge billing computer BC according to the invention.

An example of an arrangement with which the invention can be implemented is illustrated in FIG. 1.

In a telecommunications network PSTN, which for example can be an ISDN telecommunications network (ISDN=Integrated Services Digital Network), a cellular telecommunications network or a mixed speech and data network, further devices not shown in FIG. 1 have been represented by exchanges SW1, SW2 and SW3 and charge computers BS1 and BS2. The charge computer BS1 is connected to a charge billing computer BC via a connection VBC1 and the charge computer BS2 is connected thereto via a connection VBC2. The connections VBC1 and VBC2 can be permanently established for example on a LAN (Local Area Network) or a WAN (Wide Area Network) or established as required. The exchanges SW1 and SW2 are interconnected via a connection line VTR. The connection line VTR can consist of a group of channels between the two exchanges. However it is also possible for the connection VTR to be routed across further exchanges not shown in FIG. 1. The exchanges SW1, SW2 and SW3 serve subscriber lines which have not been shown and which can be connected to the relevant exchanges SW1, SW2 and SW3 either directly or via preceding local exchanges or front-end equipment. The telecommunications network PSTN can also comprise further connection lines, exchanges etc. which have not been shown for reasons of clarity. The exchanges SW1, SW2 and SW3 detect charge source data for telecommunications services incurred for example by the use of the subscriber lines, served by said exchanges, for speech or data connections or for services of a so-called intelligent network. The charge source data are sent by the exchanges SW1, SW2 and SW3 to the charge computers BS1 and BS2.

A few essential components of the exchange SW1 have been shown by way of example, namely connection means TRSW1, control means CPUSW1 and storage means MEMS1. With the connection means TRSW1 on the one hand the exchange SW1 can establish data and speech connections between subscriber lines or other exchanges. On the other hand the connection means TRSW1 can also establish connections for the transmission of charge source data, such as for example a connection V11-VB11 to the charge computer BS1. The connection means TRSW1 contains for example input/output assemblies and subscriber-line modules. The control means CPUSW1 is a processor or group of processors which can execute commands stored in the storage means MEMS1. The control means CPUSW1 controls the functions of the exchange SW1 and thereby influences the functions of the connection means TRSW1 for example. The connection means TRSW1, the control means CPUSW1 and the storage means MEMS1 are interconnected by connections not shown in FIG. 1. Additionally, the exchange SW1 can comprise further assemblies, e.g. a switching network or interface to a network management system.

The exchanges SW2 and SW3 have a similar internal structure to the exchange SW1. The functions fulfilled by the control means CPUSW1 for the exchange SW1 are fulfilled for the exchange SW2 by the control means CPUSW2 and for the exchange SW3 by the control means CPUSW3. Additionally the exchange SW2 comprises storage means MEMS2 and the exchange SW3 storage means MEMS3 which in each case perform functions comparable with the storage means MEMS1 of the exchange SW1. The exchange SW2 can establish connections with the aid of connection means TRSW2 and the exchange SW3 can establish connections with the aid of connection means TRSW3. The connection means TRSW2 and the connection means TRSW3 fulfil similar functions to the connection means TRSW1. The connection means TRSW2, the control means CPUSW2 and the storage means MEMS2, and the connection means TRSW3, the control means CPUSW3 and the storage means MEMS3 are in each case interconnected by connections not shown in FIG. 1.

The exchange SW1 and the exchange SW2 are assigned a charge computer BS1, indicated by a broken-line box GRP. The charge computer BS1 undertakes the processing of the charge source data of the exchanges SW1 and SW2, from which it generates charge billing data for the charge billing computer BC. The charge computer BS1 comprises connection means TRBS1, control means CPUBS1 and storage means MEMBS1. The charge computer BS1 can be a server operated by a UNIX operating system or Windows NT operating system. The control means CPUBS1 is a processor or cluster of processors which executes the commands of the operating system stored in the memory MEMBS1. The storage means MEMBS1, which for example comprises a hard disc or RAM modules, also stores program code sequences which are executed by the control means CPUBS1 and control the functions of the charge computer BS1. The connection means TRBS1, the control means CPUBS1 and the storage means MEMBS1 are interconnected by connections not shown in FIG. 1.

The control means CPUBS1 also influences the functions of the connection means TRBS1 with which for example the forementioned connection V11-VB11 can be established. The charge computer BS1 also comprises further assemblies which have not been shown in FIG. 1, for example a monitor, a keyboard and a mouse. The charge computer BS1 can also serve further exchanges in addition to the exchanges SW1 and SW2.

The charge computer BS1 is preferably a double computer unit or multiple computer arrangement whose computers are interconnected for example via a local network so that upon the failure of one computer, the remaining computer(s) assume(s) the functions of the failed computer. However, the control means CPUBS1, the storage means MEMBS1 and the connection means TRBS1 can also each consist of duplicated components so that upon the failure of one of the said components, the particular other component assumes the functions thereof.

The exchange SW3 is assigned the charge computer BS2 which processes the charge source data of the exchange SW3 into charge billing data for the charge billing computer BC. The charge computer BS2 has fundamentally the same structure as the charge computer BS1 and comprises control means CPUBS2, storage means MEMBS2 and connection means TRBS2 which are interconnected by connections not shown in FIG. 1 and whose functions are basically the same as the functions of the control means CPUBS1, the storage means MEMBS1 and the connection means TRBS1. Like the charge computer BS1, the charge computer BS2 can also be a multiple computer arrangement or comprise duplicated components. The exchange SW3 and the charge computer BS2 can also be coupled to one another via a LAN, in which case they form a combination of charge computer and exchange of the type described in the introduction.

For users of the telecommunications network PSTN, thus also for users of the subscriber lines served by the exchanges SW1, SW2 and SW3, the charge billing computer BC creates bills from charge billing data, which are generated and sent by the charge computers BS1 and BS2 for the exchanges SW1, SW2 and SW3. The charge billing computer BC consists for example of a so-called billing centre (BC) or customer care and billing centre (CCBC).

A few essential components of the charge billing computer BC, namely connection means TRBC, control means CPUBC and storage means MEMBC, have been shown by way of example. Via the connection means TRBC the charge billing computer BC is connected to the charge computers BS1 and BS2 for the transmission of the charge billing data. The control means CPUBC consists of a processor or group of processors which can execute program code sequences stored in the storage means MEMBC. The control means CPUBC controls the functions of the charge billing computer BC and thereby influences the functions of the connection means TRBC for example. The connection means TRBC, the control means CPUBC and the storage means MEMBC are interconnected by connections not shown in FIG. 1.

The exchange SW1 is connected via a connection V11 and a node N11 to a communications structure P1 and via a connection V12 and a node N21 to a communications structure P2. The charge computer BS1 is connected via a connection VB11 and the node N11 to the communications structure P1 and via a connection VB12 and the node N21 to the communications structure P2. Via the connections V11-N11-VB11 and V12-N21-VB12 the exchange SW1 sends the charge computer BS1 charge source data containing charge data incurred for telecommunications services provided by the exchange SW1. The exchange SW1 transmits the charge source data for example in ASN.1 data structures (ASN. 1=Abstract Syntax Notation 1). From these charge source data the charge computer BS1 generates charge billing data for the charge billing computer BC, which the charge computer BS1 can transmit to the charge billing computer BC on the connection VBC1 likewise in ASN. 1 data structures but also in a proprietary format specially adapted to the requirements of the charge billing computer BC.

The communications structures P1 and P2 have been shown in the form of buses by way of example in FIG. 1 and for example can each represent an Ethernet. The communications structures P1 and P2 can also be designated as a WAN (WAN=Wide Area Network). Transmission preferably takes place on the communications structures P1 and P2 using an internet protocol or transmission control protocol/internet protocol (TCP/IP).

It is also possible for example for the communications structure P1 to be based on a signalling network, for example the central signalling system No. 7, while the communications structure P2 is based on a X-25 network or ATM network (ATM=Asynchronous Transfer Mode). Other possible carrier media for the communications structures P1 and P2 are for example frame-relay networks, virtual private networks (VPN), datex-M networks offered by Deutsche Telekom AG or, when adequate mechanisms are in place to protect against unauthorised access to the charge source data to be transmitted, also the internet. The nodes N11 and N21 consist for example of routers, access-servers or other network nodes or network access devices of the communications structures P1 and P2.

The connection V11-VB11 and/or connection V21-V22 can also be established on one or more bearer channels on the telecommunications network PSTN, e.g. on ISDN connections. Then for example the node N11 can also be dispensed with or can be an exchange of the telecommunications network PSTN. A bearer channel connection on the telecommunications network PSTN can be established as a permanent connection, e.g. as a leased-line connection, or can be established as required as a dialled connection.

The connections V11, V12 and VB11, VB12 can each comprise a plurality of transmission channels. Additionally, to increase the fail-safety, each of the connections V11, V12 and VB11, VB12 can comprise a plurality of, for example duplicated, transmission channels which are physically independent of one another. Preferably, not only do the connections V11 and V12 terminate at separate input/output assemblies of the connection means TRSW1 and the connections VB11 and VB12 at separate input/output assemblies of the connection means TRBS1, but in the case of duplicated transmission channels these transmission channels also in each case terminate at separate input/output assemblies. Especially when duplicated, physically independent transmission channels are used in order to improve the fail-safety, the nodes N11 and N21 expediently are provided at least in duplicate.

The measures referred to in the foregoing, together with other measures not described, for as fail-safe as possible a transmission of charge source data from the exchange SW1 to the charge computer BS1 result in an overall reliable system of exchange and charge computer which, even in the event of a disturbance on a transmission path, functions reliably using at least one second transmission path.

The exchange SW2 is connected via a connection V21 and a node N12 to the communications structure P1 and via a connection V22 and a node N22 to the communications structure P2. Additionally, the exchange SW3 is connected via a connection V31 and a node N13 to the communications structure P1 and via a connection V32 and a node N23 to the communications structure P2. The charge computer BS2 is connected via a connection VB21 and the node N13 to the communications structure P1 and via a connection VB22 and the node N23 to the communications structure P2.

In a disturbance-free state and with a standard load, in the present case the exchanges SW1 and SW2 transmit their charge source data to the charge computer BS1, and the exchange SW3 transmits its charge source data to the charge computer BS2. In this case the exchange SW1 can send the charge source data to the charge computer BS1 in a different format, a different structure and a different scope compared to those in which the exchange SW2 sends its charge source data. Such a situation can occur for example if, in the course of an interchange of software, the exchange SW1 is operated with different software to the exchange SW2. Using program code stored in the storage means MEMBS1 and executed by the control means CPUBS1, the charge computer BS1 can for example evaluate the different types of charge source data of the exchanges SW1 and SW2 and convert said data into charge billing data for the charge billing computer BC.

A charge billing computer is normally designed to receive from an exchange, or from an arrangement of exchange and charge computer, only the charge billing data of this exchange. However in the present case the charge computer BS1 sends both first charge billing data emanating from the exchange SW1 and also second charge billing data emanating from the exchange SW2. In order that the charge billing computer BC can assign the first and second charge billing data to the exchanges SW1 and SW2 respectively, the charge computer inserts identifiers, in each case assigned to the exchanges SW1 and SW2, into the first and second charge billing data respectively. However it is also possible for the connection VBC1 to comprise a plurality of separate channels or separate connection paths and for one channel or group of channels to be assigned to the first charge billing data of the exchange SW1 and a different channel or different group of channels to be assigned to the second charge billing data of the exchange SW2.

Normally the charge billing computer BC requests charge billing data from the charge computers BS1 and BS2. For this purpose, using CMISE telegrams (CMISE=Common Management Information Element) the charge billing computer BC requests for example the charge computer BS1 to send the charge billing computer BC charge billing data currently stored by the charge computer BS1. Using the FTAM protocol (FTAM=File Transfer Access Medium) the charge computer BS1 then sends the charge billing data in the form of data files. Further CMISE telegrams between charge billing computer BC and charge computer BS1 then terminate the transmission procedure. Here the storage means MEMBS1 and MEMBS2 are designed such that the relevant charge computer BS1 and BS2 can intermediately store charge source data and/or charge billing data between the requests by the charge billing computer BC. However the charge billing computer BC can also for example use the FTP protocol (File Transfer Protocol) to request from the charge computer BS1 charge billing data stored by said charge computer BS1.

However it is also possible for the charge computer BS1 to send charge billing data to the charge billing computer BC not upon request but spontaneously in each case following the reception of charge source data from the exchange SW1 or the exchange SW2. Such a process is also referred to as hot billing or real-time billing.

If a fault occurs in the "active" charge computer BS1 or if the charge computer BS1 is overloaded, the exchange SW1 and/or exchange SW2 can indeed firstly store their charge source data in their storage means MEMS1 and MEMS2 respectively, which expediently are appropriately designed for such a situation. However the exchanges SW1 and SW2 can also send their charge source data to the charge computer BS2 which, in the normal operation of the "active" charge computer BS1, performs a standby function from the standpoint of the exchanges SW1 and SW2. The failure or overloading of the charge computer BS1, and thus a possible condition for the transmission of the charge source data to the charge computer BC2, is determined by the exchange SW1, for example in that it unsuccessfully attempts to send charge source data to the charge computer NS1. The charge computer BS2 then assumes the functions of the charge computer BS1 and, for the exchanges SW1 and SW2, sends charge billing data to the charge billing computer BC. However it is also possible for the exchanges SW1 and SW2 to send charge source data to the charge computer BS2 not only in the event of a disturbance but also in normal operation. In such a case, in a loadsharing process the load for the charge computers BS1 and BS2 can be specified by the exchanges SW1 and SW2 in accordance with a predetermined ratio. If one of the charge computers BS1 or BS2 fails, the particular other charge computer assumes the functions of the failed charge computer.

Additionally, the connections V11-VB11 and V12-VB12 can also be operated both in an active/standby process and in a loadsharing process. It is also possible for example for the connection V12-VB12 to be omitted and for the exchange SW1 to send charge source data to the charge computer BC1 exclusively via the connection V11-VB11 in normal operation. If the connection V11-VB11 is disturbed or overloaded, the exchange SW1 can also send charge source data via the connection VTR to the exchange SW2. The exchange SW2 then forwards the charge source data of the exchange SW1 to the charge computer via the connections V21-VB21 or V22-VB22. Additionally, the charge computer BS1 can be preceded by an exchange which forms an end point for the connections VB11 and VB12, for example if these are routed across bearer channels of the telecommunications network PSTN.

Especially for the above described procedures of switching over the exchanges SW1 and SW2 between the charge computers BS1 and BS2, it is expedient for the exchanges SW1 and SW2 to check—preferably cyclically—the availability of the charge computer which they are in each case assigned. This can be effected on the one hand by means of suitable check telegrams or on the other hand as it were automatically, for example in that the exchange SW1 evaluates each successful transmission of charge source data to the charge computer BS1 as evidence of its availability.

The exchanges SW1, SW2 and SW3 are monitored and controlled by a so-called network management system of which a control computer NMS, which controls and monitors the exchange SW1 via a connection VNMS, has been shown by way of example. The connection VNMS and the control computer NMS can for example form part of a TMN system (Telecommunications Management Network). If for example a fault relating to the exchange SW1 occurs in the charge computer BS1, the charge computer BS1 sends a fault message to the exchange SW1. The exchange SW1 then notifies the control computer NMS. Conversely, the control computer NMS can also send control commands via the exchange SW1 to the charge computer BS1. However it is also possible for the charge computer BS1 to possess its own, so-called OAM interface (OAM=Operation Administration Maintenance), which has not been illustrated in FIG. 1 and via which the charge computer BS1 is connected directly, without the exchange SW1, to the control computer NMS or to an alternative control computer which has not been shown. The charge computer BS1 can also on the one hand be monitored and controlled by the control computer NMS together with the exchange SW1 so-to-speak from the standpoint of the telecommunications network PSTN, and on the other hand can be monitored and controlled in respect of charge preparation together with the charge billing computer BC by the control computer which has not been shown.

What is claimed is:

1. A process for processing charge data for telecommunications services wherein a first exchange sends first charge source data for telecommunications services to a (first) charge computer, the (first) charge computer converts the first charge source data into first charge billing data detectable by a charge billing computer, the (first) charge computer sends the first charge billing data to the charge billing computer, wherein at least one second exchange sends second charge source data for telecommunications services to the (first) charge computer, the (first) charge computer converts the second charge source data into second charge billing data detectable by the charge billing computer and the (first) charge computer sends the second charge billing data to the charge billing computer, wherein in the event of a disturbance, the first charge computer sends the first exchange alarm messages which the first exchange forwards to a network control device.

2. An exchange (SW1) for processing charge data for telecommunications services, with transmitting means (TRSW1) for transmitting charge source data for telecommunications services to a first charge computer (BS1) by which the charge source data are converted into charge billing data detectable by a charge billing computer (BC) and sent to the charge billing computer (BC), characterised in that the exchange (SW1) comprises recognition means (CPUSW1,MEMSW1) which are designed such that by comparison with at least one predetermined criterion the exchange (SW1) can recognise that the exchange is to send the charge source data for telecommunications services at least in part to a second charge computer (BS2), and that the transmitting means (TRSW1) are designed such that as function of the at least one predetermined criterion, the exchange can send the charge source data for telecommunications services at least in part to the second charge computer (BS2) by which the charge source data are converted into charge billing data detectable by the charge billing computer (BC) and sent to the charge billing computer (BC).

3. A program module for an exchange (SW1) for processing charge data for telecommunications services, wherein the program module contains program code which can be executed by a processor (CPUSW1) of the exchange (SW1), and wherein the exchange (SW1) comprises transmitting means (TRSW1) for transmitting charge source data for telecommunications services to a first charge computer (BS1) by which the charge source data are converted into charge billing data detectable by a charge billing computer (BC) and sent to the charge billing computer (BC), characterised in that the program module comprises at least one recognition function which is designed such that on the basis of statements of the recognition function, by comparison with at least one predetermined criterion the exchange (SW1) can recognise that the exchange (SW1) is to send the charge source data for telecommunications services at least in part to a second charge computer (BS2), and that the program module comprises at least one transmitting function which is designed such that on the basis of statements of the transmitting function, in dependence upon the at least one predetermined criterion the exchange can send the charge source data for telecommunications services at least in part to the second charge computer (BS2), by which the charge source data are converted into charge billing data detectable by the charge billing computer (BC) and sent to the charge billing computer (BC).

4. The exchange of claim 2, wherein said first charge computer converts said charge source data into charge billing data by at least removing data from said charge source data.

* * * * *